US012611051B2

(12) United States Patent
LaMontagne et al.

(10) Patent No.: US 12,611,051 B2
(45) Date of Patent: Apr. 28, 2026

(54) DOOR PANEL FOR A MERCHANDISER

(71) Applicant: Hussmann Corporation, Bridgeton, MO (US)

(72) Inventors: Rick M. LaMontagne, Warrenton, MO (US); Venkata Sai charan Sunkara, Sarasota, FL (US); Sunil K. Vennu, Warrenton, MO (US); Ian J. Weathers, Azusa, CA (US)

(73) Assignee: Hussmann Corporation, Bridgeton, MO (US)

( * ) Notice: Subject to any disclaimer, the term of this patent is extended or adjusted under 35 U.S.C. 154(b) by 87 days.

(21) Appl. No.: 18/421,172

(22) Filed: Jan. 24, 2024

(65) Prior Publication Data

US 2024/0245230 A1 Jul. 25, 2024

Related U.S. Application Data

(60) Provisional application No. 63/481,500, filed on Jan. 25, 2023.

(51) Int. Cl.
*A47F 3/00* (2006.01)
*A47F 3/04* (2006.01)
*E06B 5/00* (2006.01)

(52) U.S. Cl.
CPC .............. *A47F 3/043* (2013.01); *E06B 5/006* (2013.01)

(58) Field of Classification Search
None
See application file for complete search history.

(56) References Cited

U.S. PATENT DOCUMENTS

| | | | | |
|---|---|---|---|---|
| 2,700,194 | A * | 1/1955 | Rasmussen | F25D 23/082 49/34 |
| 2,753,695 | A * | 7/1956 | Maranto | F25D 19/00 62/DIG. 13 |
| 4,905,347 | A * | 3/1990 | Wroth | E05F 1/123 16/75 |
| 5,048,233 | A * | 9/1991 | Gidseg | F25D 23/02 49/501 |
| 8,473,864 | B2 | 6/2013 | Segal et al. | |
| 8,672,427 | B2 | 3/2014 | Hammonds | |
| 8,683,745 | B2 | 4/2014 | Artwohl et al. | |
| 8,801,116 | B1 | 8/2014 | Pack et al. | |
| 9,052,536 | B2 | 6/2015 | Artwohl et al. | |
| 9,155,405 | B2 | 10/2015 | Artwohl et al. | |

(Continued)

FOREIGN PATENT DOCUMENTS

| | | |
|---|---|---|
| WO | 2017127035 A1 | 7/2017 |
| WO | 2020131881 A1 | 6/2020 |

*Primary Examiner* — Steven M Marsh
(74) *Attorney, Agent, or Firm* — Michael Best & Friedrich LLP

(57) ABSTRACT

A door is configured to be coupled to a merchandiser. The door includes a first opaque panel and a second opaque panel coupled to the first opaque panel. The first and second opaque panels define a cavity therebetween. The door also includes a hinge coupled to at least one of the first opaque panel or the second opaque panel, a stiffener positioned in the cavity and in contact with the first and second opaque panels, and an insulative material disposed within the cavity and configured to bond to one or both of the first opaque panel and the second opaque panel to form a rigid door. The hinge is configured to pivotably couple the door to the merchandiser.

19 Claims, 19 Drawing Sheets

(56) References Cited

U.S. PATENT DOCUMENTS

| | | | | |
|---|---|---|---|---|
| 9,435,579 | B1 * | 9/2016 | House | E05D 7/081 |
| 9,504,338 | B2 | 11/2016 | Artwhol et al. | |
| 9,684,124 | B2 | 6/2017 | Dunn | |
| 9,863,690 | B1 * | 1/2018 | Demiroez | F25D 23/04 |
| 9,984,660 | B2 | 5/2018 | Kim et al. | |
| 10,514,722 | B1 | 12/2019 | Artwohl et al. | |
| 10,575,660 | B2 | 3/2020 | Artwohl et al. | |
| 10,580,333 | B2 | 3/2020 | Artwohl et al. | |
| 10,641,540 | B2 | 5/2020 | Williamson | |
| 10,672,032 | B2 | 6/2020 | Avakian | |
| RE48,115 | E | 7/2020 | Artwhol et al. | |
| 10,769,666 | B2 | 9/2020 | Avakian | |
| 10,838,453 | B2 | 11/2020 | Artwohl et al. | |
| 10,937,344 | B2 | 3/2021 | Artwohl et al. | |
| 10,963,078 | B2 | 3/2021 | Lee et al. | |
| 11,000,133 | B2 | 5/2021 | Jafa et al. | |
| 11,021,905 | B1 * | 6/2021 | Ekshinge | E06B 3/2632 |
| 11,141,004 | B1 | 10/2021 | Rolek | |
| RE49,103 | E | 6/2022 | Artwhol et al. | |
| 11,419,434 | B1 | 8/2022 | Artwohl et al. | |
| 11,435,777 | B2 | 9/2022 | Artwohl et al. | |
| 11,450,247 | B2 | 9/2022 | Artwohl et al. | |
| 12,031,769 | B2 * | 7/2024 | Ekshinge | F25D 23/04 |
| 12,063,456 | B2 * | 8/2024 | Schroeder | F25D 29/005 |
| 2006/0174641 | A1 | 8/2006 | Liu et al. | |
| 2007/0070615 | A1 | 3/2007 | Joslin et al. | |
| 2011/0115355 | A1 * | 5/2011 | Heckler | F25D 23/02 312/405 |
| 2013/0328472 | A1 * | 12/2013 | Shim | B21D 22/205 413/8 |
| 2014/0078407 | A1 | 3/2014 | Green et al. | |
| 2016/0045038 | A1 * | 2/2016 | Chubb | A47F 3/043 428/34 |
| 2017/0027339 | A1 | 2/2017 | Chang et al. | |
| 2017/0051966 | A1 * | 2/2017 | Powell | F25D 23/04 |
| 2017/0176085 | A1 * | 6/2017 | Allard | F25D 23/021 |
| 2019/0261785 | A1 * | 8/2019 | Artwohl | E06B 3/86 |
| 2020/0256612 | A1 | 8/2020 | Avakian et al. | |
| 2020/0300538 | A1 | 9/2020 | Avakian et al. | |
| 2021/0041759 | A1 | 2/2021 | Trikha et al. | |
| 2021/0183281 | A1 | 6/2021 | Artwohl et al. | |
| 2021/0192991 | A1 | 6/2021 | Hall | |
| 2022/0397338 | A1 | 12/2022 | Ryu et al. | |
| 2023/0184481 | A1 * | 6/2023 | Almaguer | F25D 23/028 49/70 |
| 2024/0023728 | A1 * | 1/2024 | Rodriguez | A47F 3/043 |

* cited by examiner

DOOR PANEL FOR A MERCHANDISER

CROSS-REFERENCE TO RELATED APPLICATIONS

This application claims priority to U.S. Provisional Patent Application No. 63/481,500, filed Jan. 25, 2023, the entire content of which is hereby incorporated by reference.

BACKGROUND

The present invention relates to merchandisers and, more particularly, to door assemblies for refrigerated merchandisers.

Existing walk-in coolers and some refrigerated merchandisers (collectively referred to as 'merchandisers') generally include structure that defines a product support area for supporting products (e.g., for stocking or selection of products, or to be accessible through an opening in the front of the merchandiser). Merchandisers are typically used in retail food store applications such as grocery or convenient stores or other locations where food product is stored in a refrigerated condition. Some merchandisers include doors to enclose the product support area of the case and reduce the amount of cold air released into the surrounding environment. Most conventional doors are transparent so that product in the product support area can be viewed from outside the merchandiser. Also, typical merchandiser doors (e.g., door assemblies with two or more glass panes) are quite heavy, which makes installation and handling difficult. For example, existing merchandiser doors for medium-temperature applications (e.g., doors with two glass panes) typically weigh more than 42 pounds, and some existing doors weigh as much as 47 pounds.

SUMMARY

In one embodiment, the invention provides a door configured to be coupled to a merchandiser. The door includes a first opaque panel and a second opaque panel coupled to the first opaque panel. The first and second opaque panels define a cavity therebetween. The door also includes a hinge coupled to at least one of the first opaque panel or the second opaque panel, a stiffener positioned in the cavity and in contact with the first and second opaque panels, and an insulative material disposed within the cavity and configured to bond to one or both of the first opaque panel and the second opaque panel to form a rigid door. The hinge is configured to pivotably couple the door to the merchandiser.

In another embodiment, the invention provides a door configured to be coupled to a merchandiser. The door includes an opaque shell defining a cavity, a hinge support temporarily affixed to an internal surface of the opaque shell, and an insulative material disposed within the cavity and configured to expand within the cavity. The door is configured to support a display by the hinge support. The hinge support is coupled to the internal surface of the opaque shell in response to expansion of the insulative material within the cavity.

In another embodiment, the invention provides a door configured to be coupled to a merchandiser supporting product. The door includes a first opaque panel, and a second opaque panel coupled to the first opaque panel and including a pocket. The first and second opaque panels define a cavity therebetween. The door also includes an insulative material disposed within the cavity, and at least a portion of an inventory management system positioned within the pocket. The inventory management system is configured to be oriented in a direction toward the product.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

For ease of discussion and understanding, the following detailed description illustrates door assembly that may be coupled or attached to a case and door frame assembly of a merchandiser. The door assembly may be used in association with any structure that includes a case frame that is configured to support a door to enclose a product support space. Examples of such a structure include, but are not limited to, a walk-in cooler, a walk-in freezer, a low temperature merchandiser (e.g., operating at a temperature below 32° Fahrenheit), a medium temperature merchandiser (e.g., operating at a temperature range of 34° to 41° Fahrenheit), or any other similar structure. Accordingly, the term "refrigerated merchandiser 10" includes the listed examples as well any structure that includes a frame that can support a door assembly.

Figure 1:
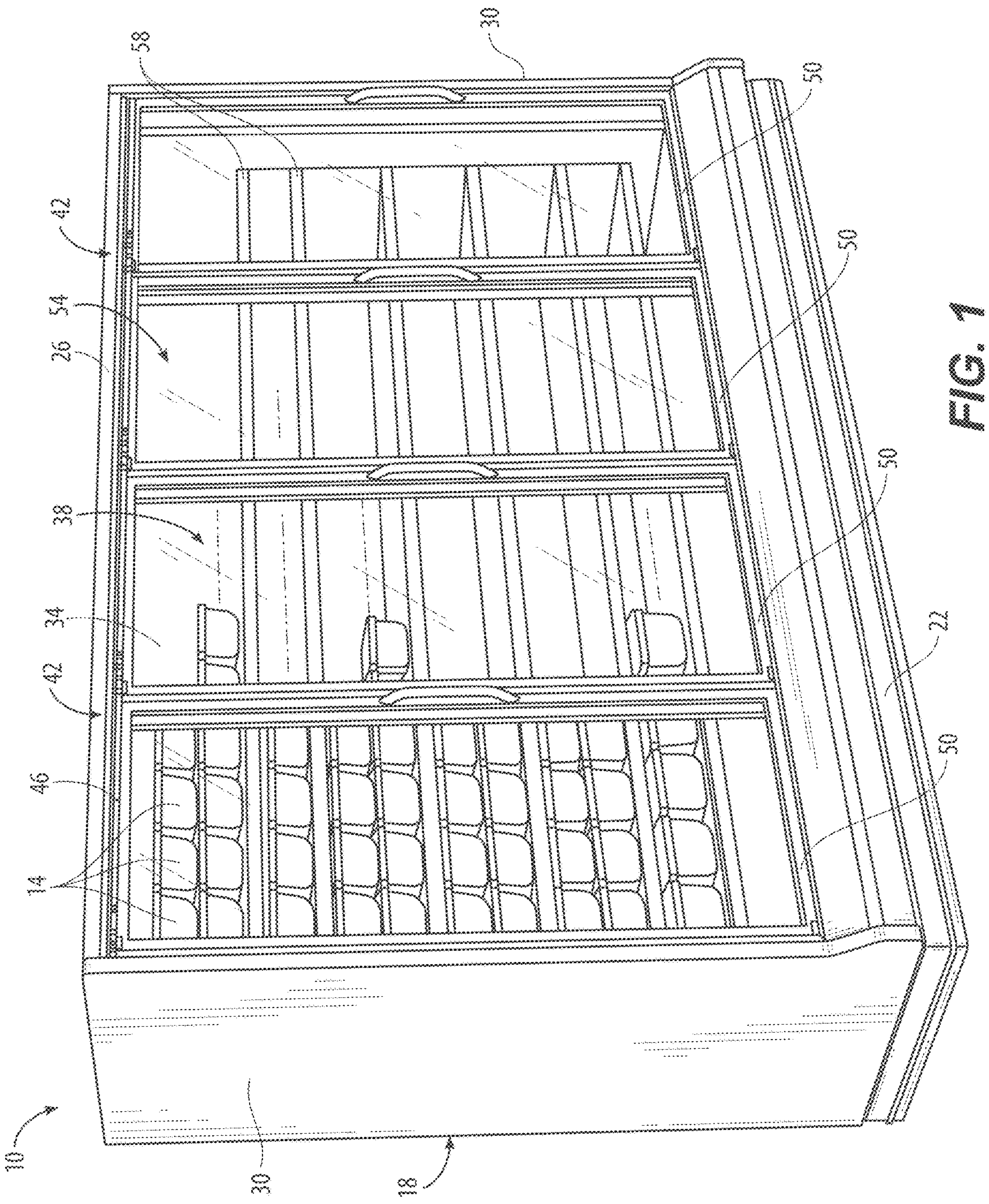
FIG. 1 is a perspective view of a merchandiser including a case and a glass panel assembly with one or more transparent panels enclosing a product support area of the merchandiser.

FIG. 1 illustrates a refrigerated merchandiser 10 that may be located in a supermarket, a convenience store, or other suitable retail location (not shown) for presenting fresh food, frozen food, beverages, or other product 14 to consumers. The merchandiser 10 includes a case 18 that is defined by a base 22, a canopy 26, opposite side walls 30, and a rear wall 34. The case 18 also includes an access opening 38 positioned opposite the rear wall 34. The access opening 38 is defined by a case frame assembly 42 that includes a case frame 46. A plurality of door assemblies 50 are coupled to the case frame 46 to provide access to the product 14 through the access opening 38. The illustrated door assemblies 50 include one or more glass panes or panels, which allow a user to view product supported inside the merchandiser 10. The area partially enclosed by the base 22, the canopy 26, and the rear wall 34 defines a product support area 54 (e.g., a volume) for supporting the product 14 in the case 18. For example, the food product can be displayed on racks or shelves 58 extending from the rear wall 34 toward the case frame 46, and the food product may be accessible by consumers through the door assemblies 50 adjacent a front of the case 18.

The refrigerated merchandiser 10 also may include a refrigeration system (not shown) that is in communication with the case 18 to provide refrigerated or cooled airflow to the product support area 54. The refrigeration system generally includes an evaporator located within an air passageway that is internal to the case 18. As is known in the art, the evaporator receives a saturated refrigerant that has passed through an expansion valve. The saturated refrigerant is evaporated as it passes through the evaporator as a result of absorbing heat from the airflow passing over the evaporator. The absorption of heat by the refrigerant allows the temperature of the airflow to decrease as it passes over the evaporator. The heated or gaseous refrigerant then exits the evaporator and is pumped back to one or more compressors (not shown) for re-processing into the refrigeration system. The cooled airflow exiting the evaporator via heat exchange with the liquid refrigerant is directed through the remainder of the air passageway and is introduced into the product support area 54 where the airflow will remove heat from and maintain the product 14 at desired conditions.

With reference to FIG. 1, the illustrated case frame assembly 42 has two case frames 46 and two corresponding door assemblies 50 attached to each case frame 46. As shown in FIG. 1, each door assembly 50 is attached to the case frame 46 in a first configuration, which is a left-hand open configuration (i.e., each door opens along a door hinge located on a left side of the door assembly 50, as viewed when facing the door assembly 50). The door assemblies 50 are configured to be oriented (or reoriented) in either a left-hand open configuration or a right-hand open configuration, and the door assemblies 50 and may not have the same configuration (e.g., the merchandiser 10 can include a combination of left-hand and right-hand open configuration) .

Figure 2:
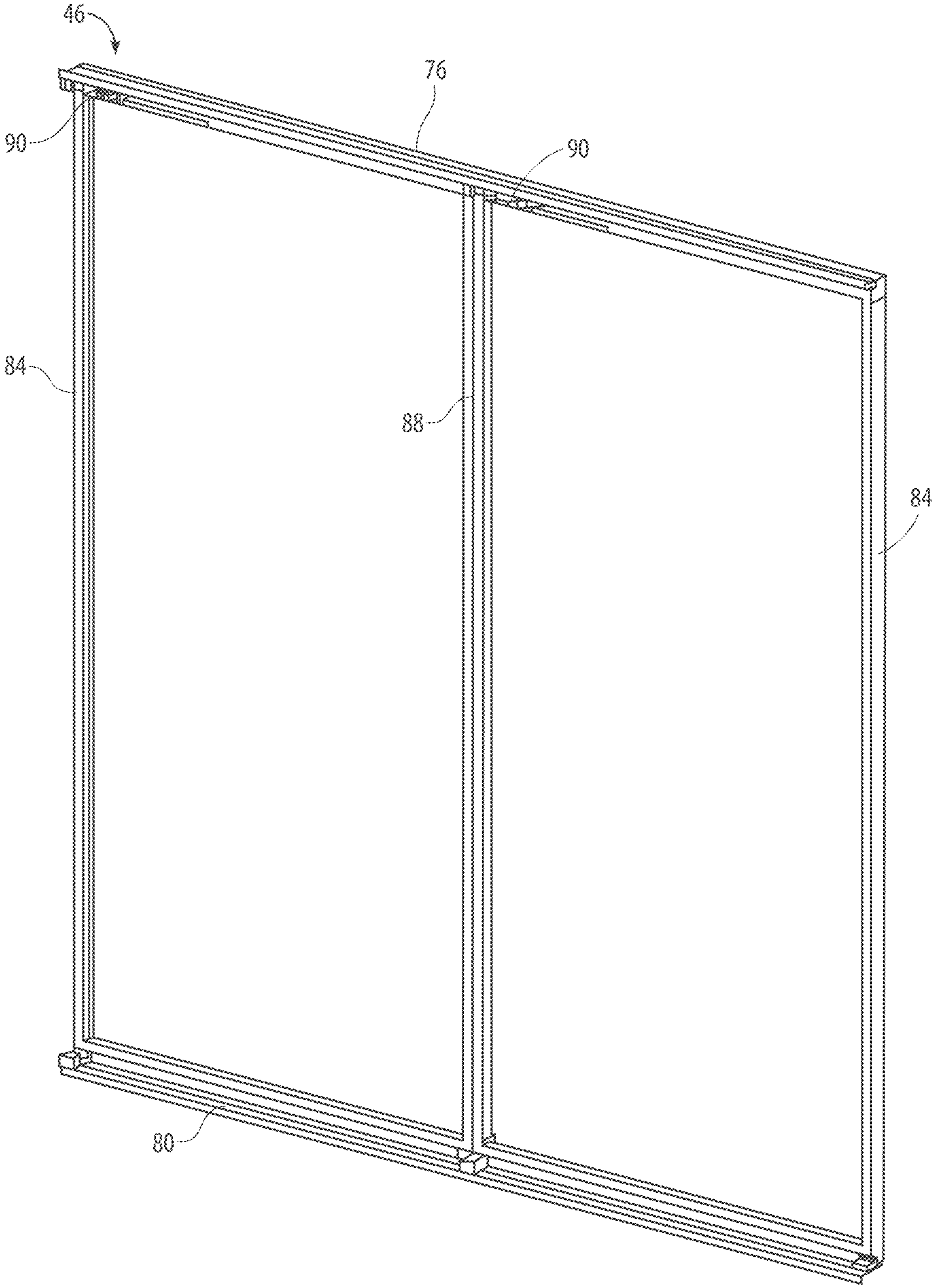
FIG. 2 is a perspective view of a door frame of the merchandiser of FIG. 1.

FIG. 2 further illustrates the case frame 46 that is modular and formed of a top frame member or top frame portion 76, a bottom frame member or bottom frame portion 80 that is opposite the top frame portion 76, and mullions or vertical supports 84, 88. A door close mechanism 90 is supported at the top and bottom of the case frame 46 to facilitate closing of the door assembly 50 after the door assembly has been opened.

Figure 3:
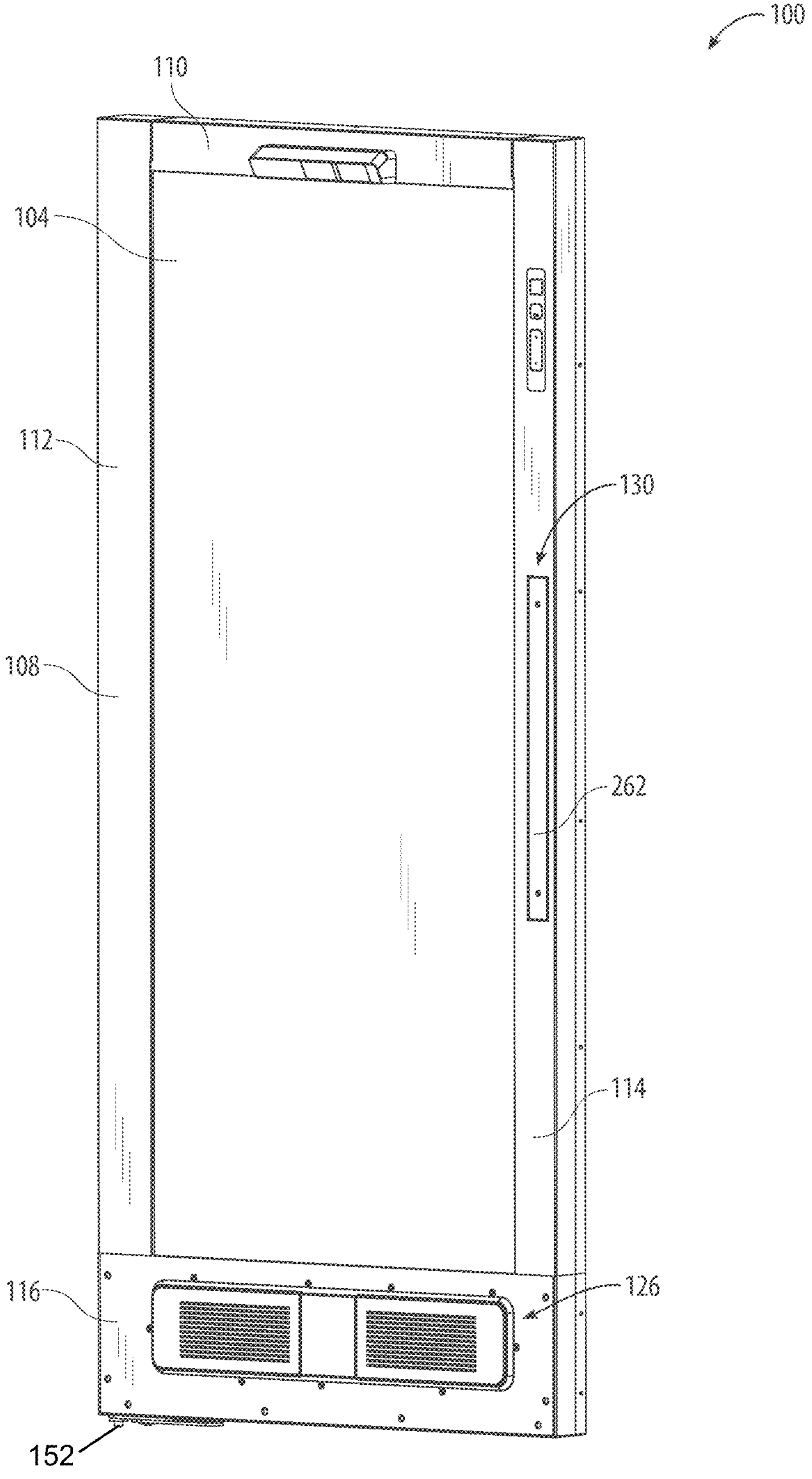
FIG. 3 is a front perspective view an exemplary door assembly according to an embodiment of the invention and including a door panel and an electronic display coupled to the door panel.
Figure 4:
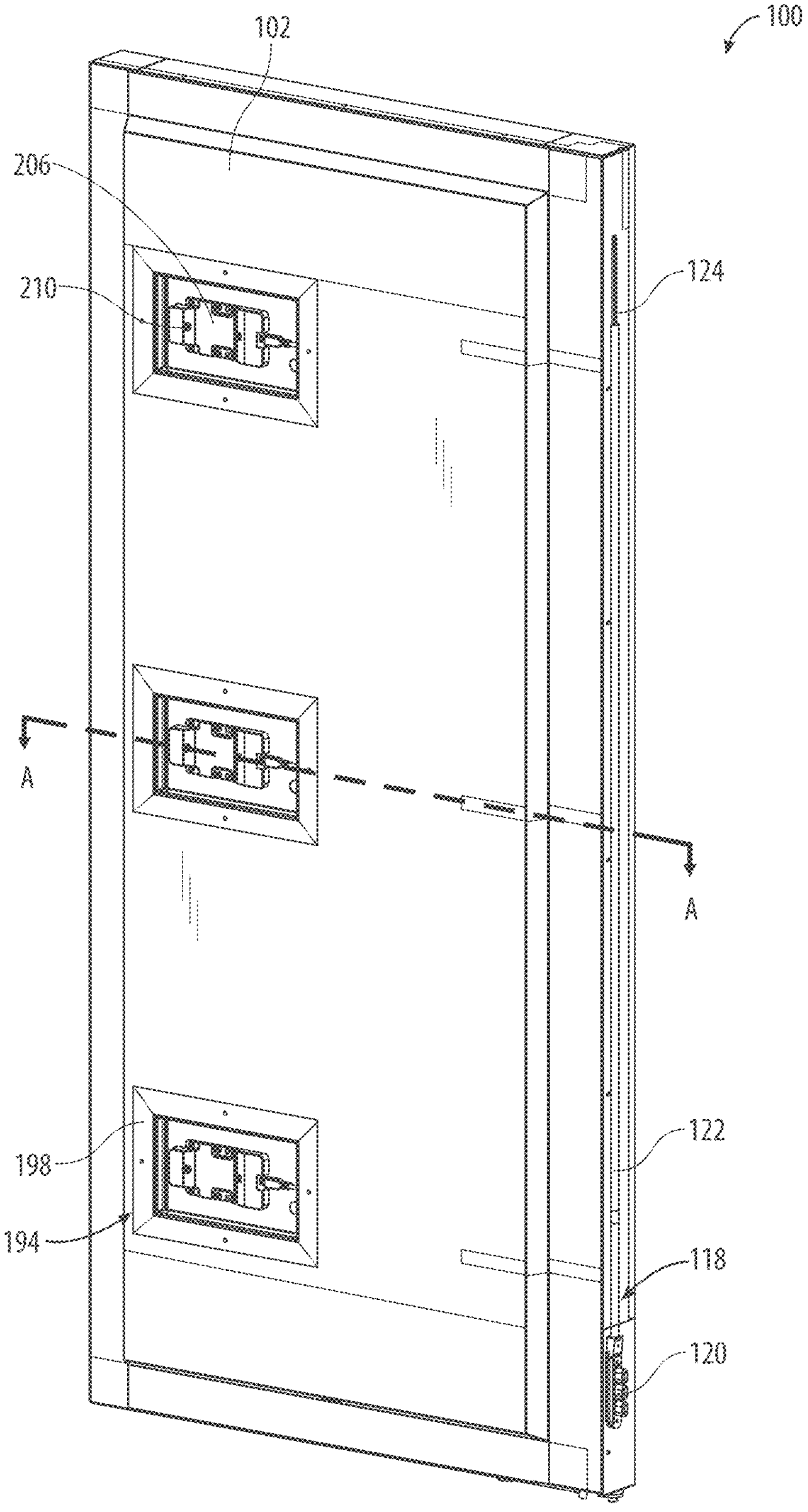
FIG. 4 is a rear perspective view the door assembly of FIG. 3.
Figure 5:
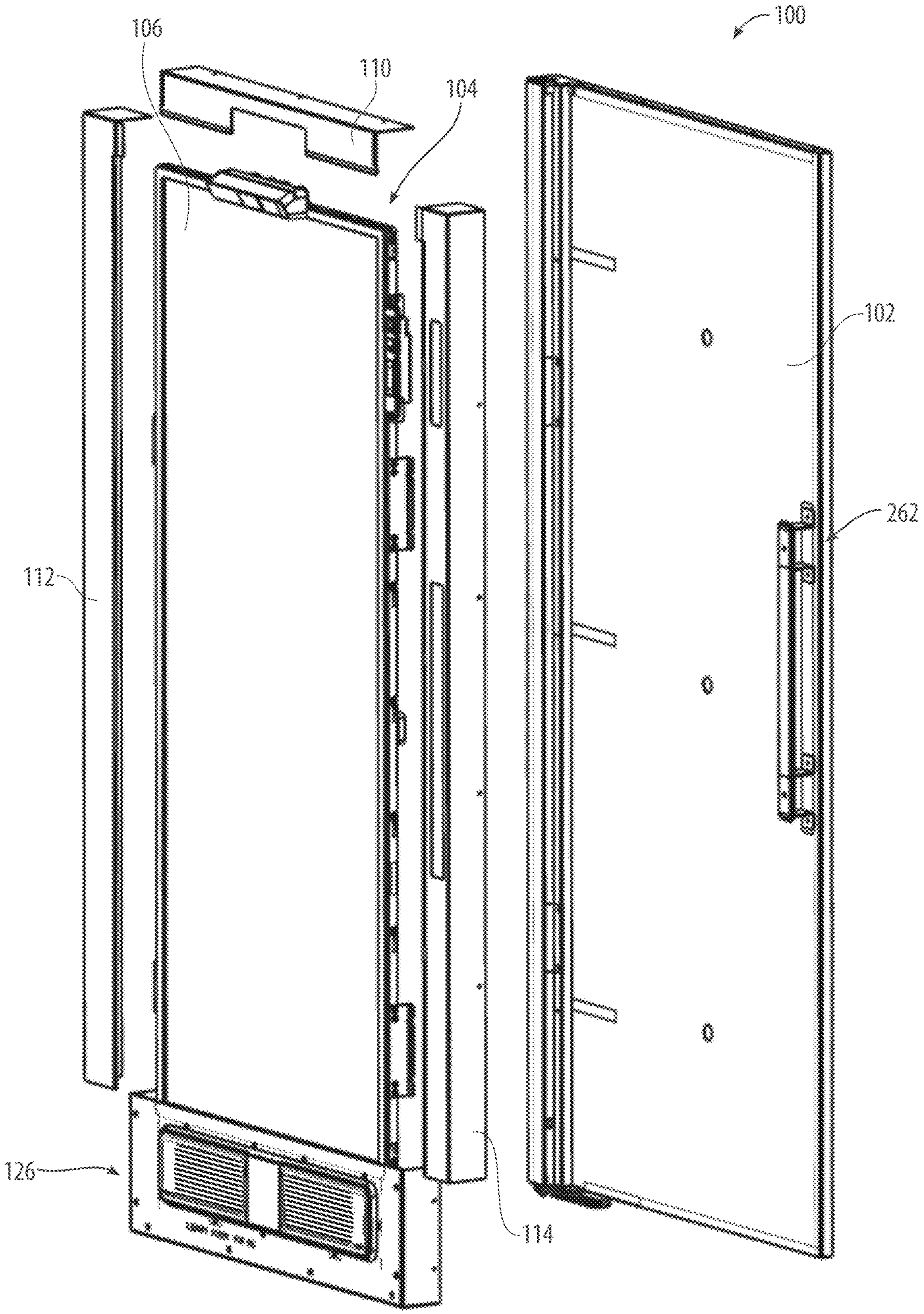
FIG. 5 is an exploded view of the door assembly of FIG. 3.
Figure 6:
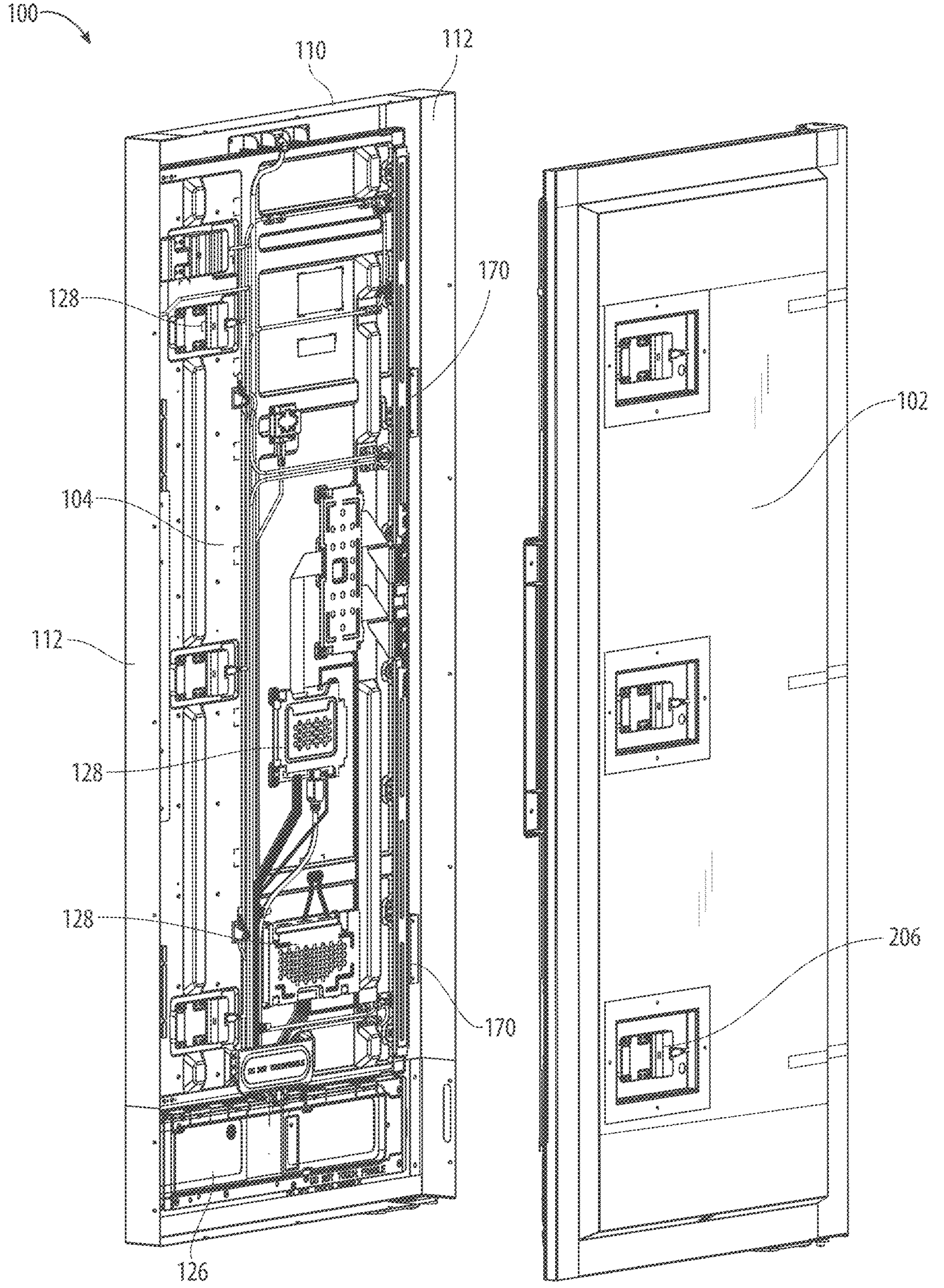
FIG. 6 is another exploded view of the door assembly of FIG. 3.

FIGS. 3 and 4 illustrate a door assembly 100 according to an embodiment of the invention that can replace or be used instead of the door assembly 50 on the merchandiser 10. The door assembly 100 includes a door or door panel 102 and a bezel configuration 108. In some embodiments, the door assembly 100 may also include an electronic display 104 that is attached to and located partially over the door panel 102, and the bezel configuration 108 is removably coupled to the door panel 102 and the electronic display 104. The illustrated bezel configuration 108 includes a top bezel section 110, a hinge bezel section 112 on one first side of the door assembly 100, a handle bezel section 114 on a second side of the door assembly 100 that is opposite the first side, and a bottom bezel section 116. The top bezel section 110, the hinge bezel section 112, the handle bezel section 114, and the bottom bezel section 116 are separate components that interface with each other to define aesthetics for the door assembly 100. It will be appreciated that the bezel configuration 108 may include one uniform or monolithic component, or two or more bezel sections (e.g., two, three, four, five, etc.) that interface with each other.

With reference to FIG. 4, the door assembly 100 includes a power connector 118 that facilitates connection to a power source to power components of the door assembly 100. The power connector 118 includes a bracket 120 that is coupled to a side of the door panel 102, a connector conduit 122 that is coupled to the bracket 120, and a plurality of wires 124 that extend through the conduit 122 and the bracket 120. A first side of the wires 124 are configured to be connected to an external power source a top side of the door assembly 100 and a second side of the wires 124 are configured to be connected to electronic components (e.g., the electronic display 104) adjacent a bottom side of the door assembly 100.

FIGS. 5-8 illustrate an embodiment of the door assembly 100 including the electronic display 104. The illustrated electronic display 104 includes a screen 106 (e.g., including LEDs) located on a first side of the electronic display 104 to provide one or more images to the user. In some embodiments, the screen 106 may show the product 14 within the merchandiser 10 via a camera facing the product 14. In other embodiments, the screen 106 may show a graphic of the product 14 and characteristics (e.g., price, quantity remaining) of the product 14. The electronic display 104 may be turned on and off via a manual switch, a timer switch, a motion sensor, or the like. The electronic display 104 also includes a control area 126 surrounded by the bottom bezel section 116. The control area 126 includes a plurality of control components (e.g., controller, circuit board, etc.), which are configured to control the operation of the electronic display 104. The electronic display 104 further includes a plurality of electronic components 128 located on a second side of the electronic display 104.

Figure 9:
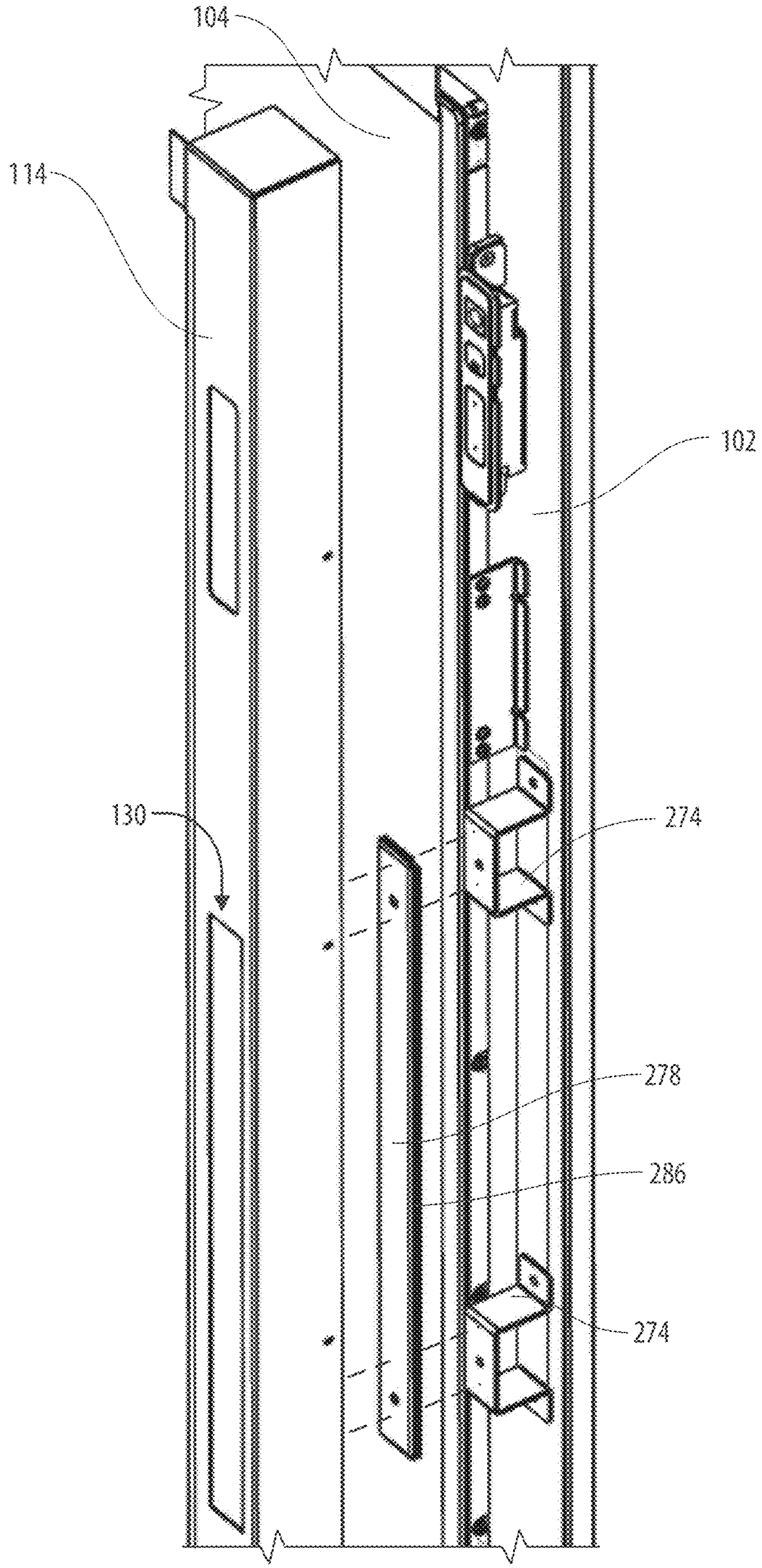
FIG. 9 is a partial exploded view of a handle assembly of the door assembly.
Figure 10:
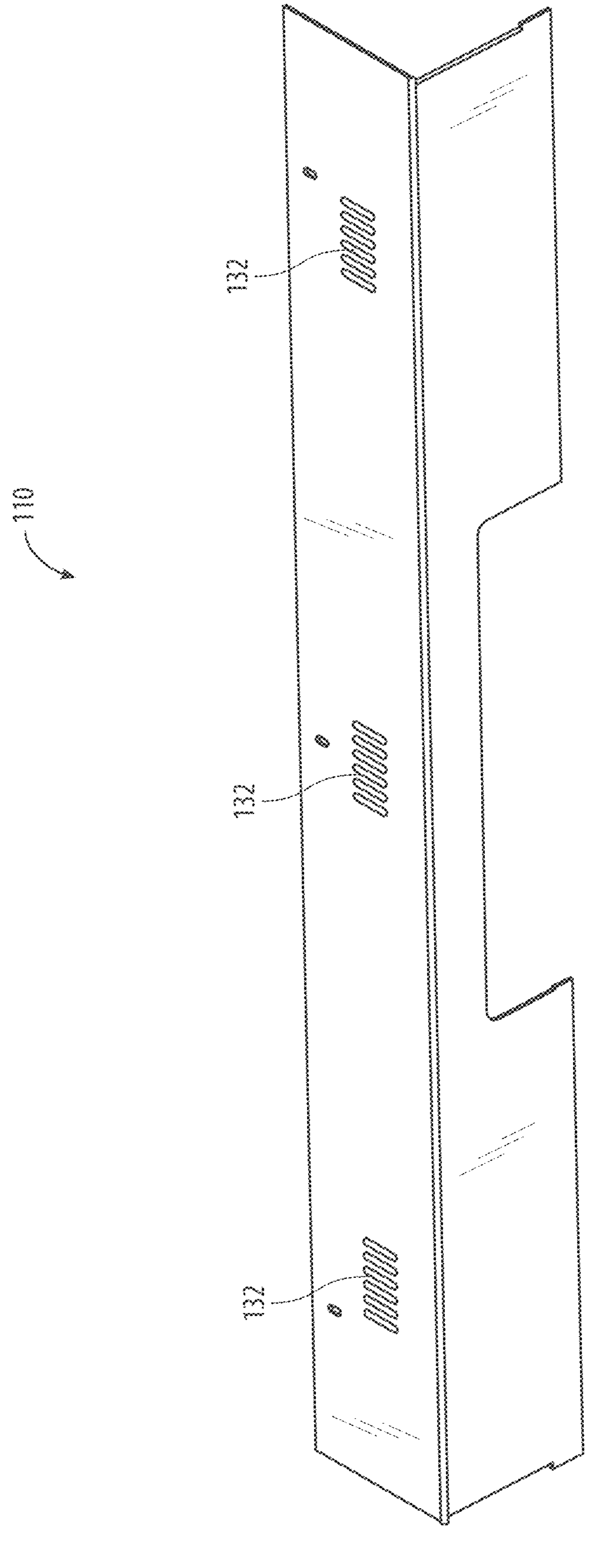
FIG. 10 is a perspective view of a vented bezel section of the door assembly.
Figure 11:
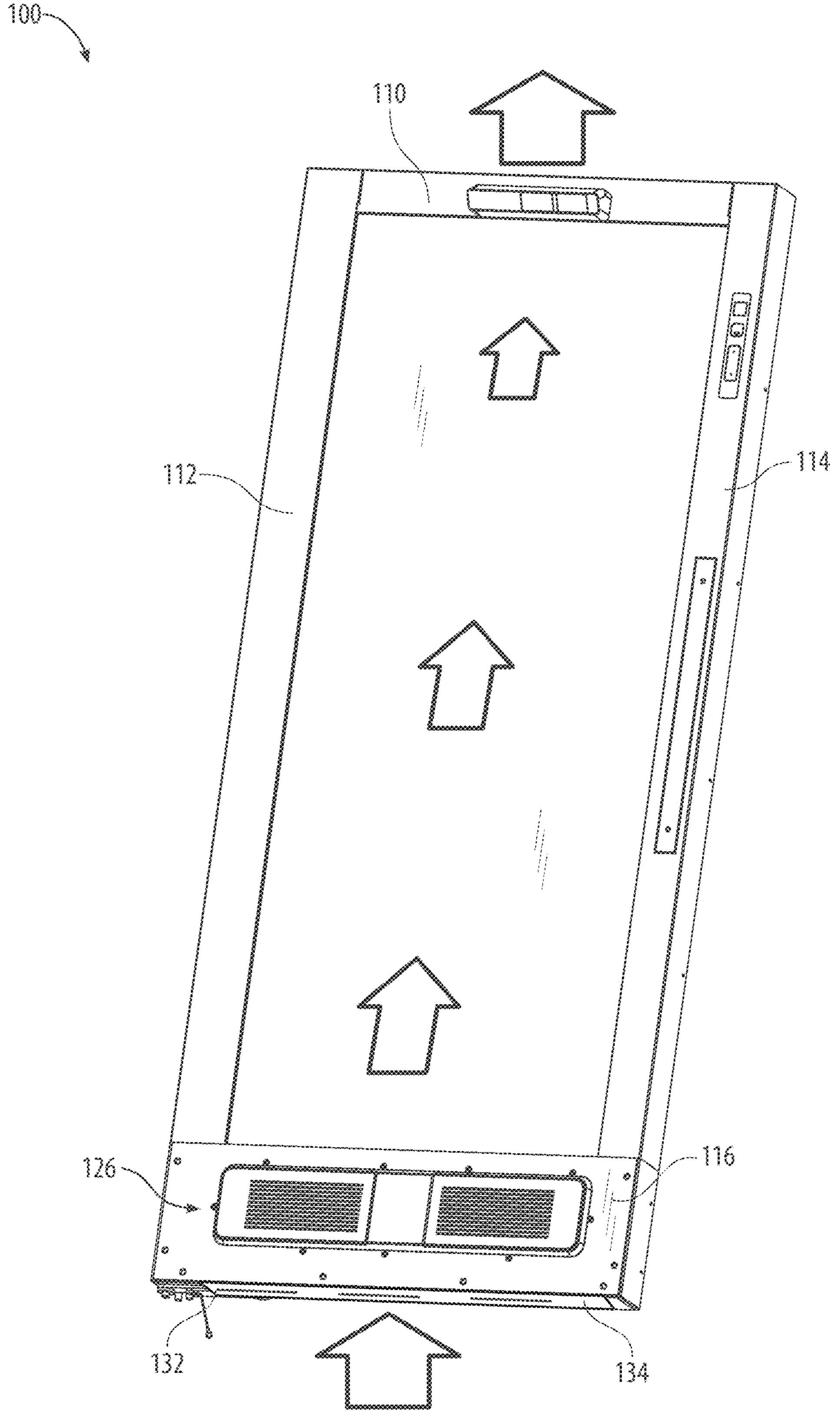
FIG. 11 is a perspective view of the door assembly illustrating airflow through the door assembly facilitated in part by the vented bezel section of FIG. 10 and another vented bezel section.

As illustrated in FIGS. 9-11, the handle bezel section 114 includes a slot 130, and the top bezel section 110 and the bottom bezel section 116 include vents 132. Air filters 134 may be located adjacent one or both of the vents 132 to inhibit debris from entering the door assembly 100.

Figure 12:
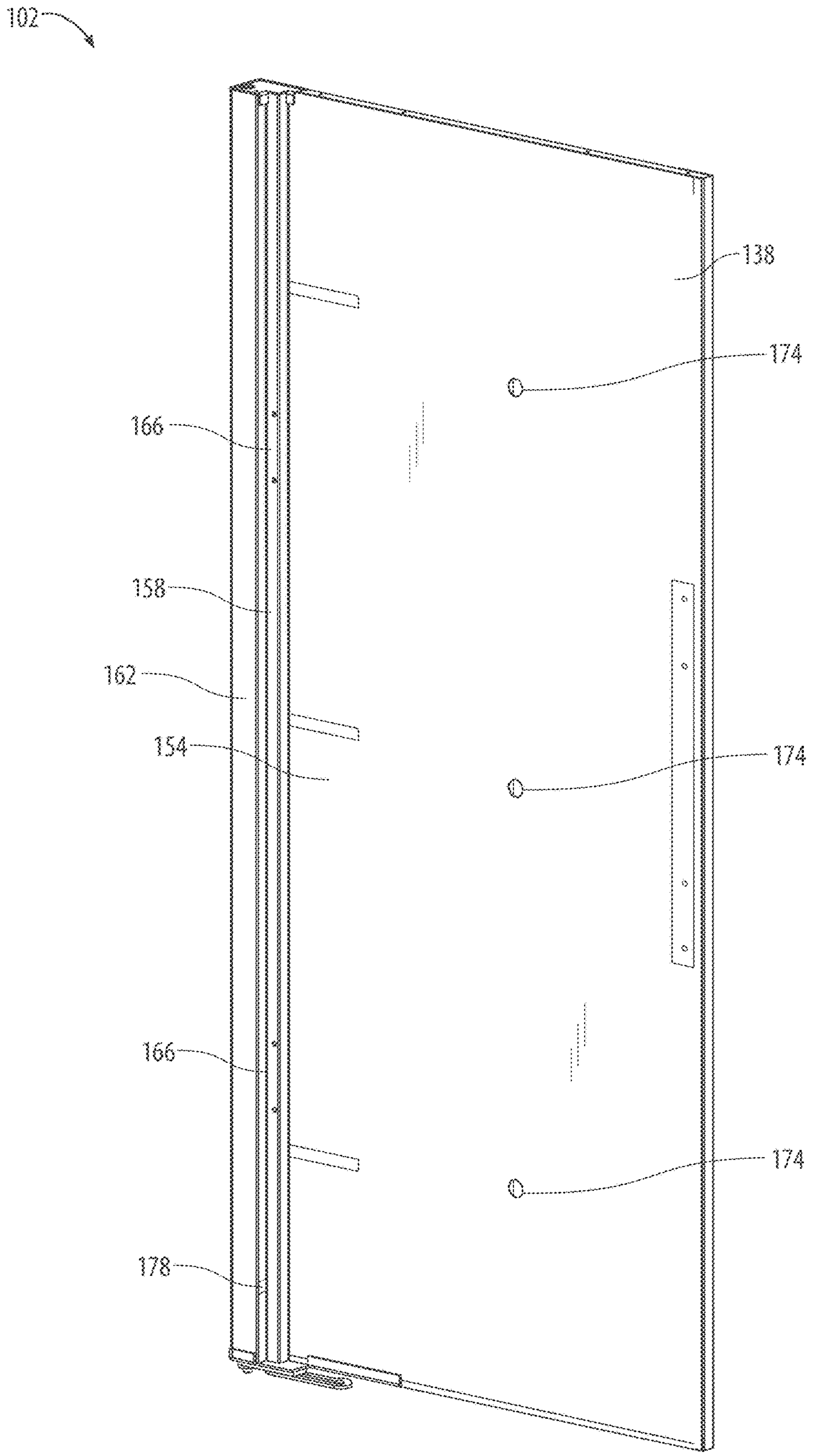
FIG. 12 a front perspective view of the door panel.
Figure 13:
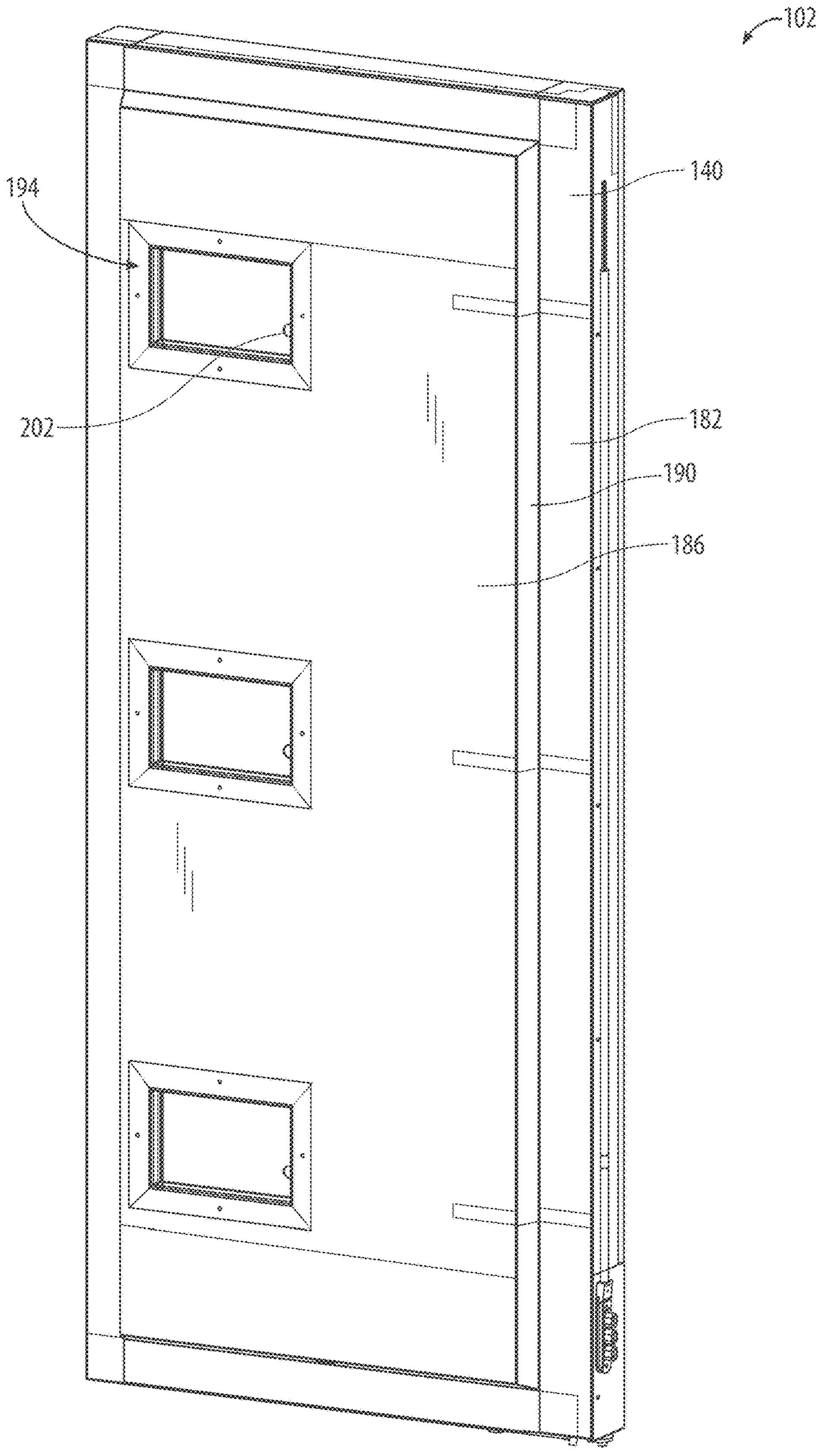
FIG. 13 is a rear perspective view of the door panel.
Figure 14:
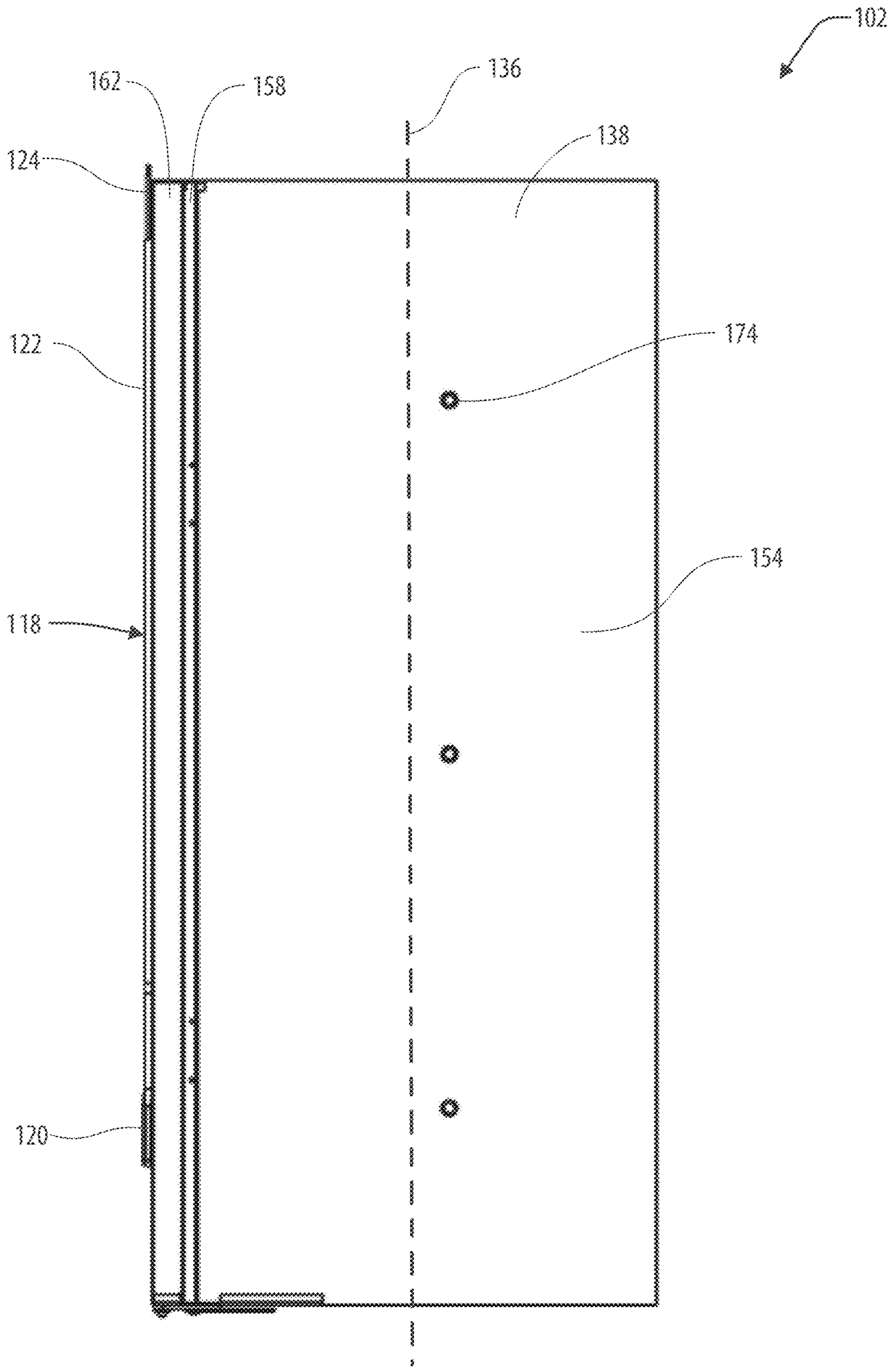
FIG. 14 is a front view of the door panel of FIG. 12.

FIGS. 12-20 illustrate the door panel 102 that is opaque, such that when the door panel 102 is coupled to the case frame 46, a user cannot see through the door assembly 100 to view the product support area 54. With reference to FIG. 14, the door panel 102 is bifurcated by a central plane 136 and includes a first side 138 and a second side 140. When the door panel 102 is attached to the case frame 46, the first side 138 faces away from the product support area 54 and the second side 140 faces toward the product support area 54. The first side 138 is defined by a first panel or inner liner 142 and the second side 140 is defined by a second panel or outer liner 146. Each of the first panel 142 and the second panel 146 is formed of sheet metal (e.g., milphos steel or aluminum) or other suitably rigid material (composite, plastic, etc.) that can be shaped (e.g., bent, pressed, punched, etc.). The first panel 142 and the second panel 146 are coupled to each other (e.g., fastened by one or more of welding or mechanical fasteners such as screws and/or bolts, etc.) to form the outer shell of the door panel 102. When attached to each other, the first and second panels 142, 146 cooperatively define a door panel cavity 150 that is filled, or mostly filled (e.g., substantially), with an insulative or core material (e.g., polyurethane foam) that may bond to each of the first and second panels 142, 146. The first panel 142 and/or the second panel 146 define thin substrates that may be treated to enhance surface tension, which can increase the bond strength between the core material and the first and second panels 142, 146. That is, the first panel 142, the second panel 146, and the insulative material form a rigid door panel that is lightweight, and low cost, composite structure.

Figure 18:
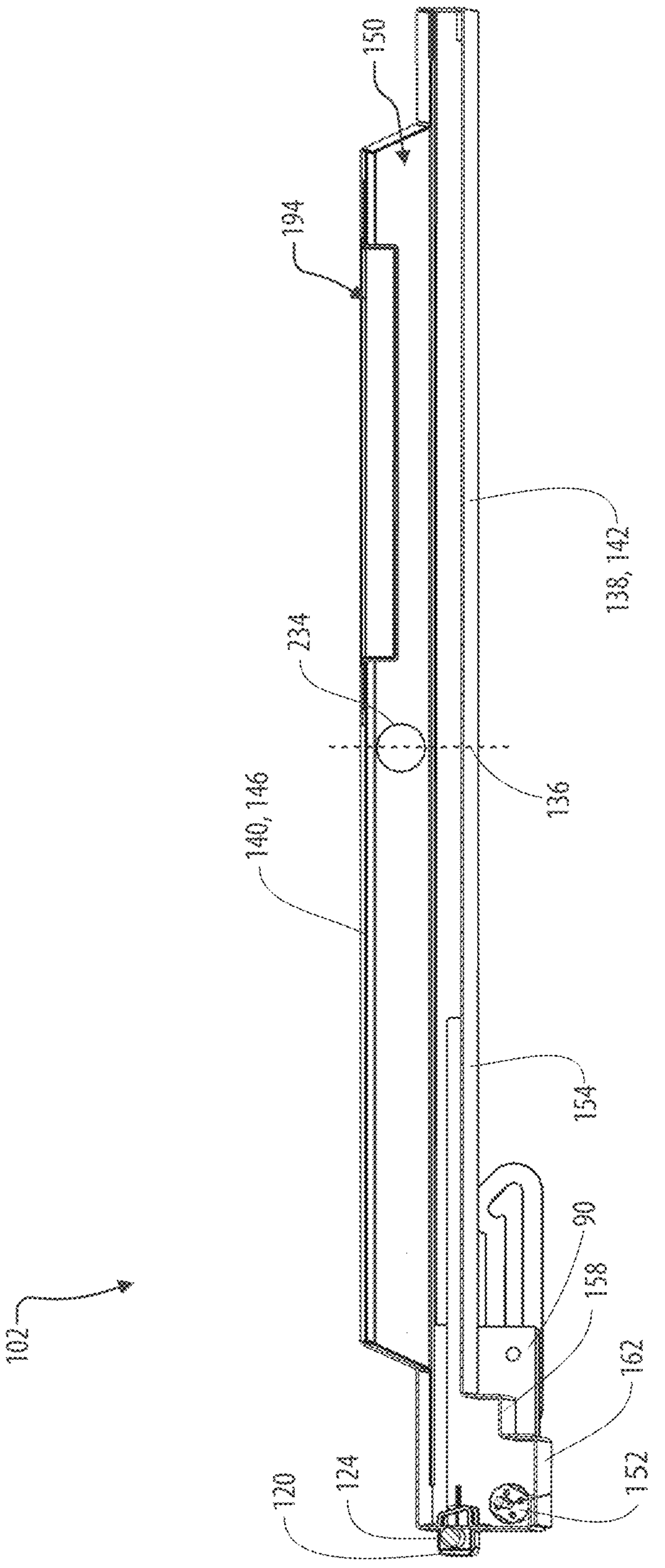
FIG. 18 is a cross-section view taken along line B-B in FIG. 15.

As best shown in FIG. 18, the first panel 142 and the second panel 146 join at or adjacent edges (e.g., lateral ends of the respective panels 142, 146 relative to the central plane 136). The door panel 102 includes top and bottom hinges 152 (only the top hinge 152 is shown in FIG. 18) that are disposed adjacent a first edge so that the door panel 102 may pivotably attach to the case frame 46. The first panel 142 has a main surface 154, a first or intermediate step 158, and a second or end step 162. The steps 158, 162 are disposed adjacent the hinged edge of the door panel 102. With reference to FIG. 12, the intermediate step 158 has a display hinge mount area 166 to which a display hinge bracket 170 of the electronic display 104 may be attached to the door panel 102. In some constructions, the display hinge mount area 166 may include a plate or other structure to strengthen the attachment of the display hinge bracket 170. The first panel 142 also has a plurality of apertures 174 to facilitate passage of electrical wire(s) into or from the door panel 102. While the apertures 174 are shown as laterally offset from the central plane 136 on a side of the central plane 136 that is opposite the steps 158, 162, it will be appreciated that the apertures 174 may be located elsewhere. The first panel 142 also may include a terminal aperture 178 to facilitate passage of electrical wire(s) (e.g., one or more power cables) between the door panel 102 and the electronic display 104. As shown, the terminal aperture 178 is located on an interior side of the end step 162 and near a bottom side of the door panel 102, although other locations for the terminal aperture are possible and considered herein.

FIG. 13 shows that the second side 140 includes a first wall 182 and a second wall 186 that are interconnected by an angled wall 190. The first wall 182 defines a perimeter of the second panel 146 and may contact the case frame 46 (e.g., via one or more seals).

Figure 15:
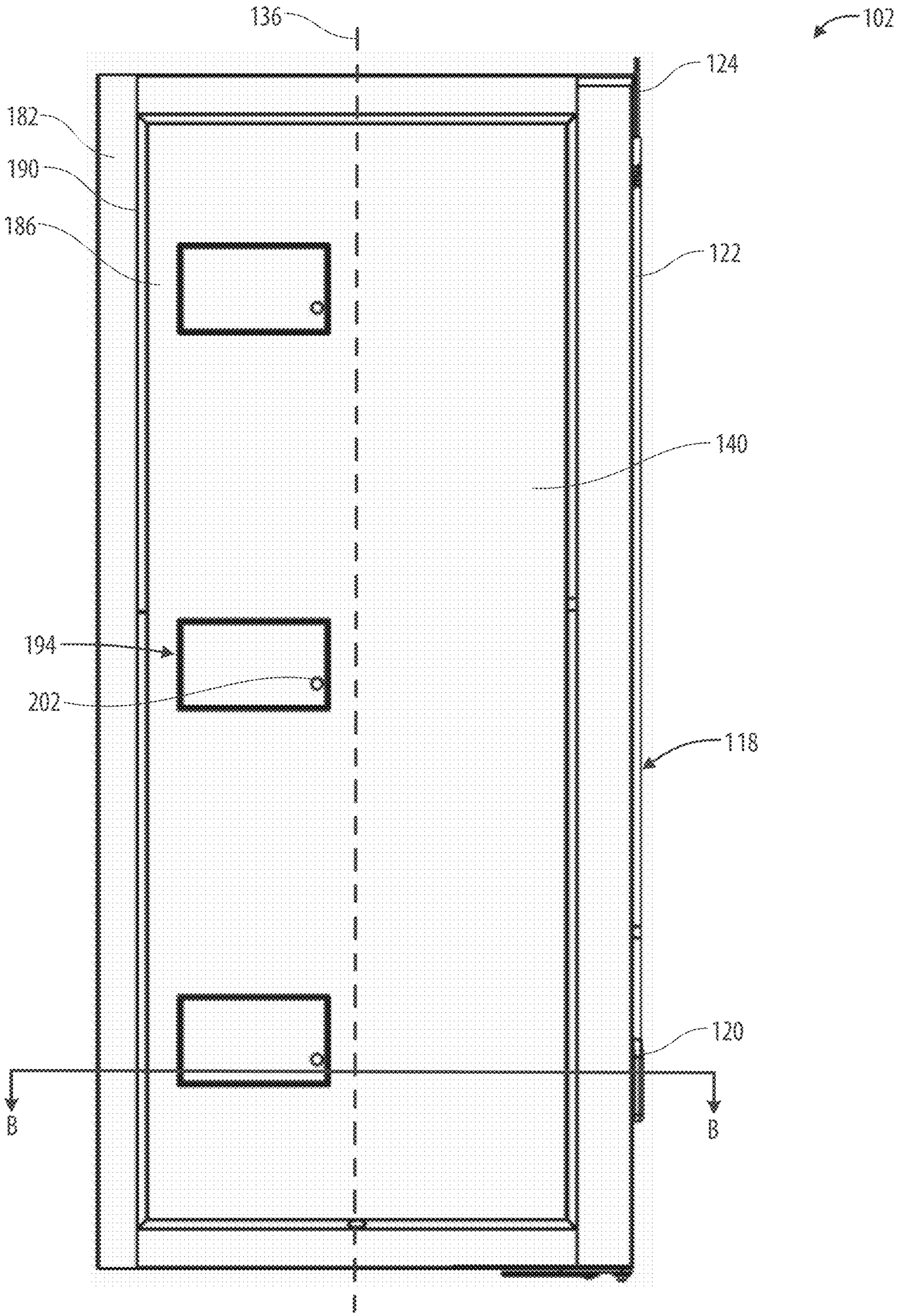
FIG. 15 is a rear view of the door panel of FIG. 13.

As best illustrated in FIGS. 4, 13, and 15, the door panel 102 includes recessed pockets 194 that are defined in the second side 140 and that are framed by flanges 198. The pockets 194 are integrally formed with the door panel 102 and, as shown in FIG. 13, the pockets 194 are laterally offset relative to the central plane 136 and are disposed on a portion of the door panel 102 that is opposite the side of the door panel 102 that has the hinges. It will be appreciated that the pockets 194 may be disposed on the door panel 102 in other locations (e.g., centrally located on the central plane 136). Each of the pockets 194 has an aperture 202 that communicates with (and may be aligned with) the apertures 174 to receive electrical wire(s).

Each pocket 194 supports an optical sensor 206 (e.g., a camera) that is capable of capturing static images and/or video. Each of the optical sensors 206 is part of an inventory management system that can be used to monitor at least a portion of the interior of the merchandiser 10. The optical sensor 206 may include a lens 210. One or more of the optical sensors 206 may be obliquely angled relative to the central plane 136 (e.g., one or more of the optical sensors may be oriented at an angle between approximately 10 degrees–75 degrees relative to the central plane 136). The optical sensor 206 also may be obliquely oriented relative to a plane 214 (FIG. 8) extending parallel to the second wall 186 and faces outward from the second side 140. The orientation of the optical sensor 206 is such that when the door assembly 100 is pivoted from a closed position to an opened position, the optical sensor 206 will be perpendicular or substantially perpendicular to the product support area 54. One or more of the optical sensors 206 may be coupled to the door panel 102 such that the one or more optical sensors 206 may move (e.g., pivot, rotate) horizontally or vertically without movement of the door panel 102. That is, each optical sensor 206 may move independent of the door panel 102 (e.g., to monitor the interior of the merchandiser 10 without opening the door panel 102).

Figure 7:
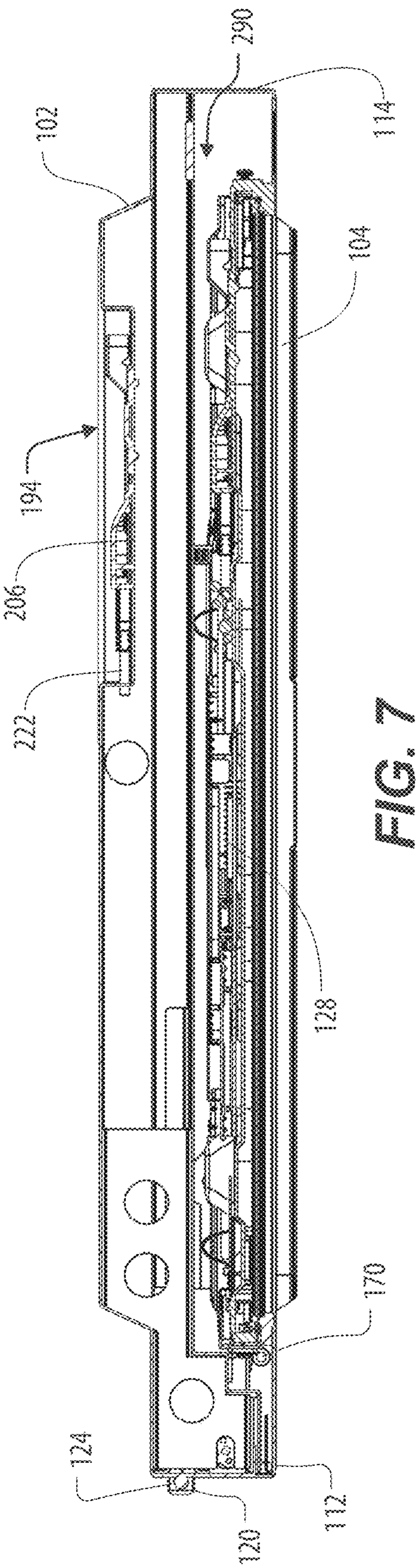
FIG. 7 is a cross-section view of the door assembly of FIG. 4 taken along line A-A.
Figure 8:
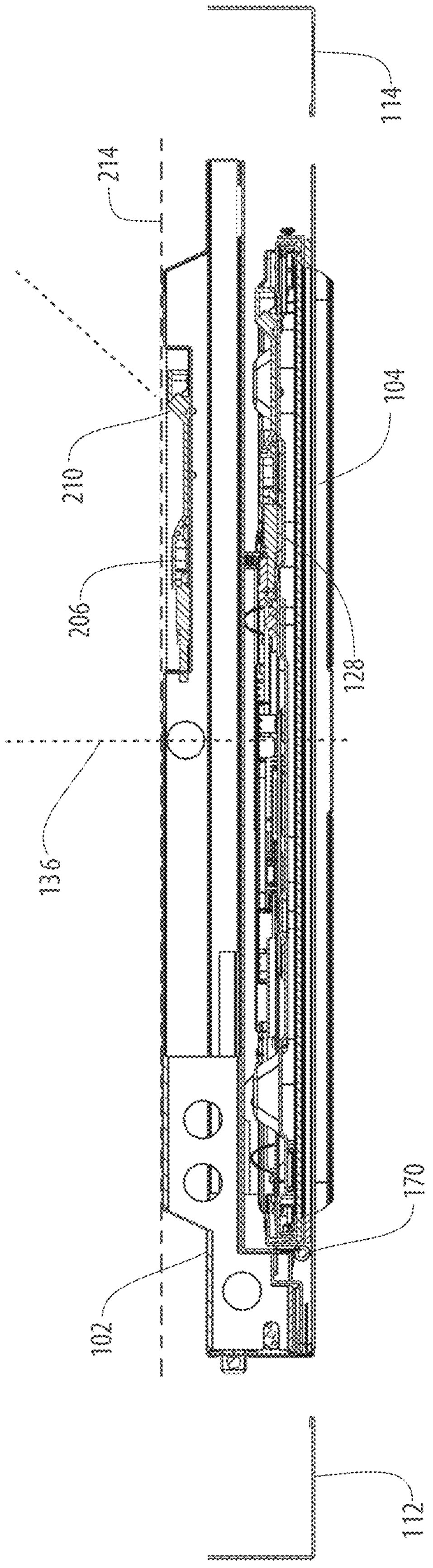
FIG. 8 is cross-section view similar to FIG. 7 and illustrating bezel sections exploded from the door assembly.

The illustrated pockets 194 are enclosed by transparent covers (e.g., glass, plexiglass) that may be coupled to the flanges 198 to prevent debris from entering the optical sensor 206. As shown in FIGS. 7 and 8, each optical sensor 206 is disposed completely within the pocket 194 such that the optical sensors 206 do not extend beyond the envelope defined by the door panel 102. A cord 222 connects the optical sensor 206 to a controller (e.g., in the door panel 102 or the electronic display 104) and extends through the aperture 202 in the pocket 194.

Figure 16:
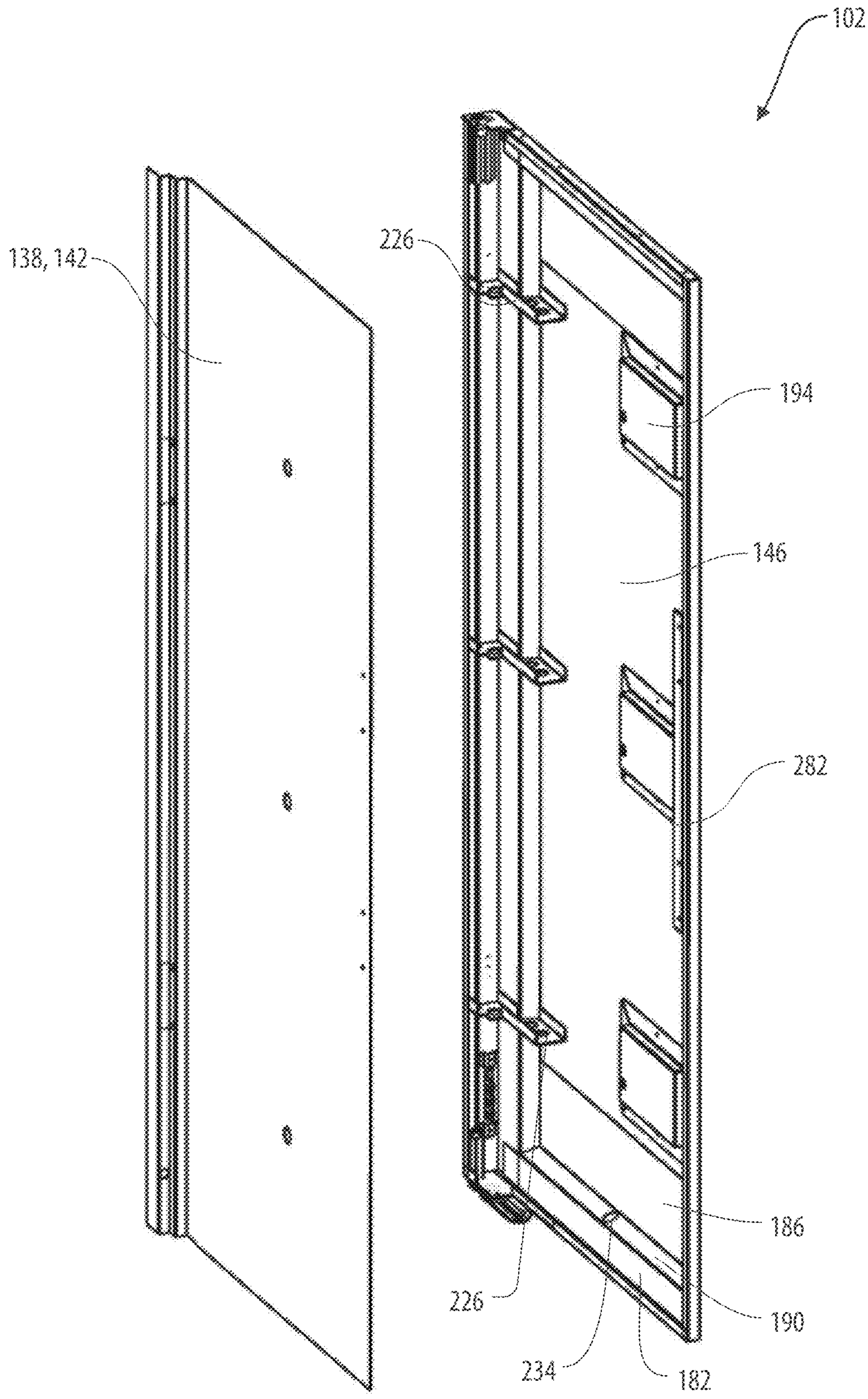
FIG. 16 is an exploded view of the door panel of FIG. 12.

As illustrated in FIG. 16, the door panel 102 includes stiffeners or support brackets 226 that are disposed in the cavity 150 and are spaced vertically (as viewed in FIG. 16) along and adjacent the edge of the door panel 102 that has the hinges. The brackets 226 least partially provide or add to the structural rigidity or stiffness of the door panel 102. Each bracket 226 has a plurality of apertures 228 and is coupled to an interior side of the second panel 146 before the first panel 142 is coupled to (e.g., positioned over) the second panel 146. Insulative material may extend through the apertures 228 to further support the support brackets 226 in the interior of the door panel 102. The illustrated support the brackets 226 are shaped to conform or fit to the first wall 182, the second wall 186, and the angled wall 190. The door panel may include other brackets or spacers that support the door panel 102.

Figure 17:
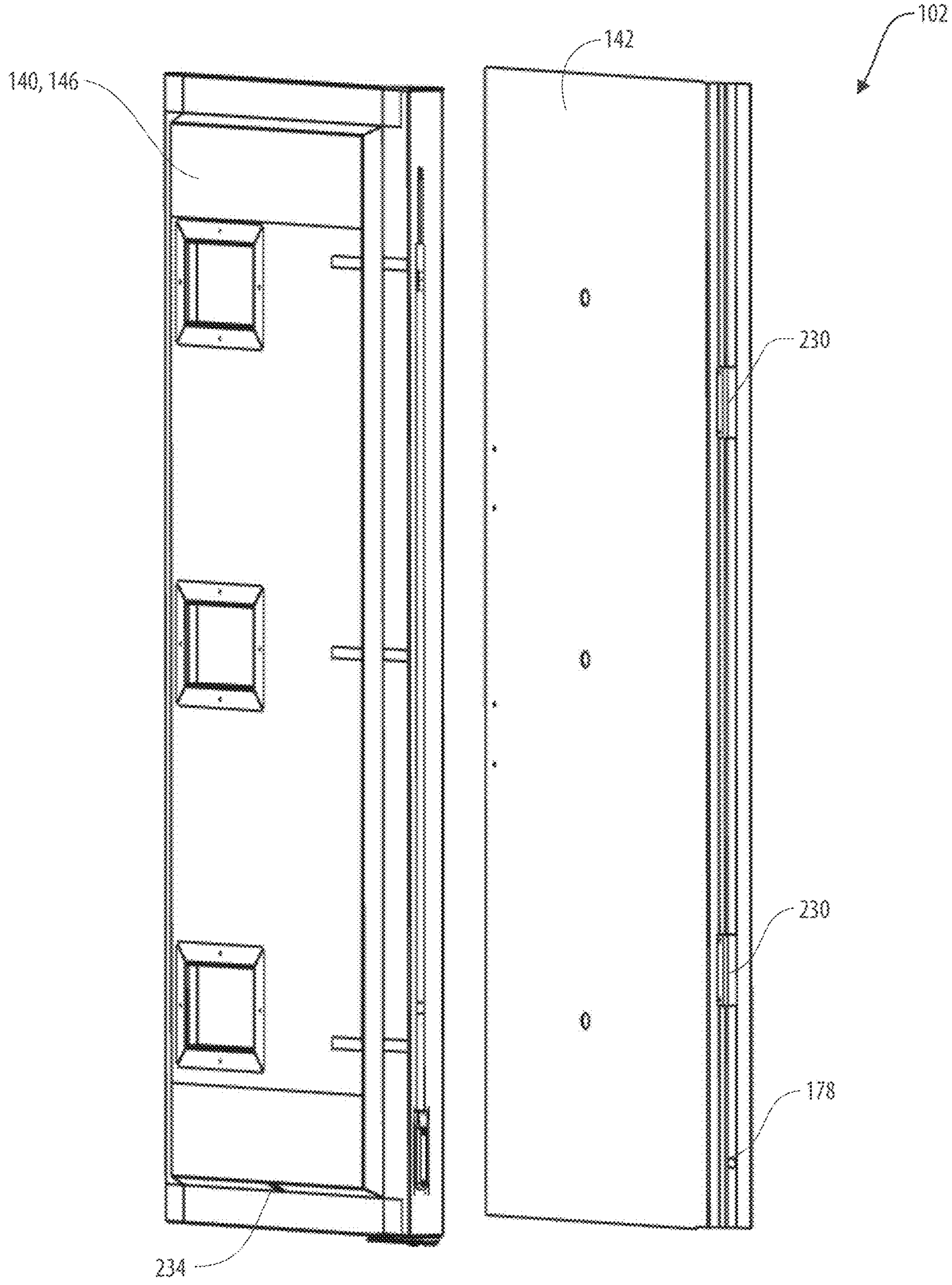
FIG. 17 is an exploded view of the door panel of FIG. 13.

With reference to FIG. 17, the door panel 102 includes hinge supports 230 that are coupled to the first panel 142 in the hinge mount area 166 and may include threaded holes for attachment of the display hinge bracket 170 to the door panel 102. The door panel 102 has structural integrity sufficient to support the weight of an additional attachment or component, such as the electronic display 104, via the first panel 142. For example, the hinge supports 230 are configured to connect the electronic display 104 to the door panel 102 and to support the electronic display 104 on the door panel 102.

Figure 19:
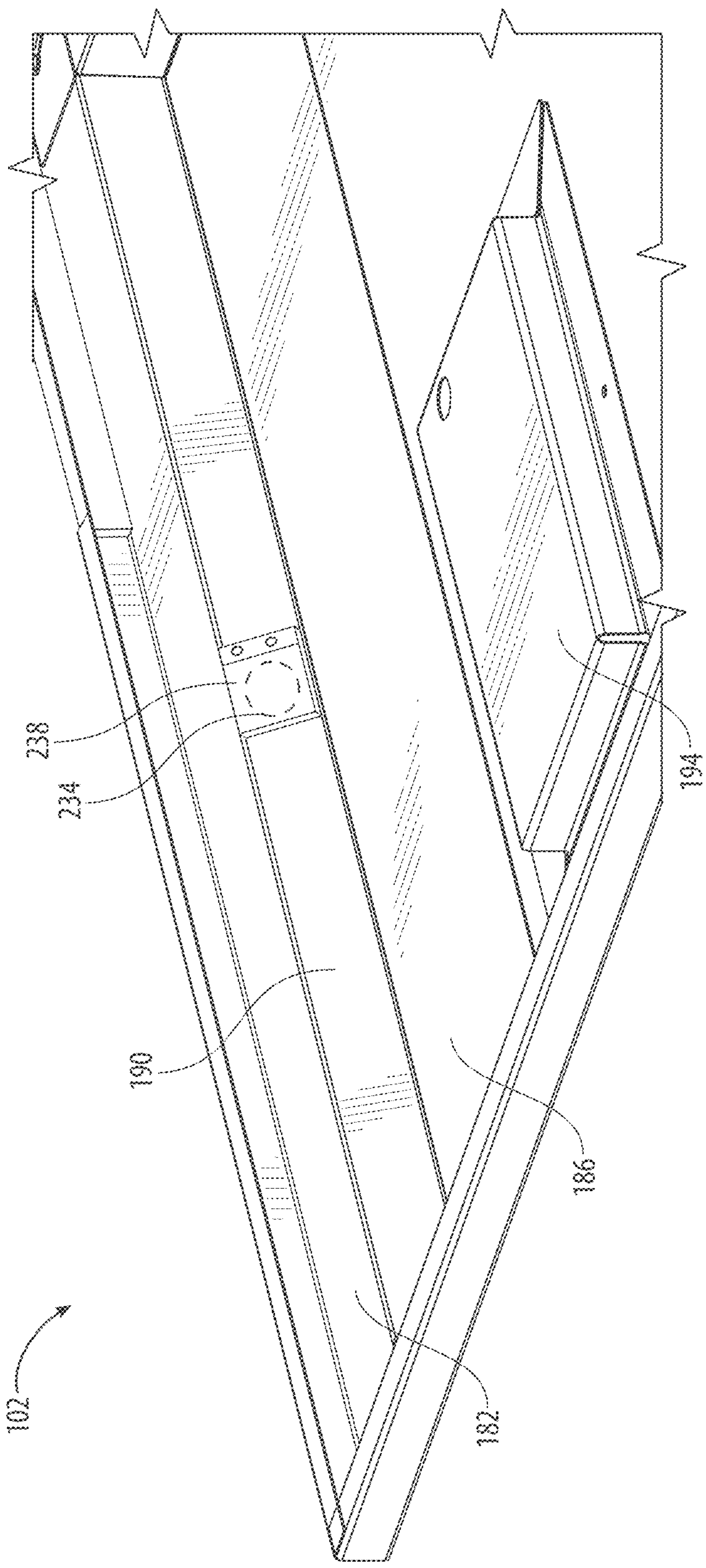
FIG. 19 is an enlarged perspective view of a portion of the door panel and illustrating a foam fill port and cover flap of the door panel.

With reference to FIGS. 16, 18, and 19, the door panel 102 includes a pour hole 234 that is covered by a flap 238. The pour hole 234 is located on the angled wall 190 near the lower side of the door assembly 100 (as viewed in FIG. 16). The flap 238 is coupled to an inside of the angled wall 190 and may pivot relative to the angled wall 190 between an opened position and a closed position (FIG. 19). As illustrated, the flap 238 is connected to the angled wall 190 by a living hinge such that the flap 238 is inherently flexible and can bend relative to a point of inflection. In some embodiments, the flap 238 may be coupled to and pivotable about a separate hinge or another bias member (e.g., a spring). Absent a force, the illustrated flap 238 is held against the angled wall 190 in the closed position by the hinge (e.g., a living hinge or another hinge). As shown, the flap 238 may be further held in the closed position by gravity due to the pour hole 234 and the flap 238 being located at the bottom of the door panel 102.

Figure 20:
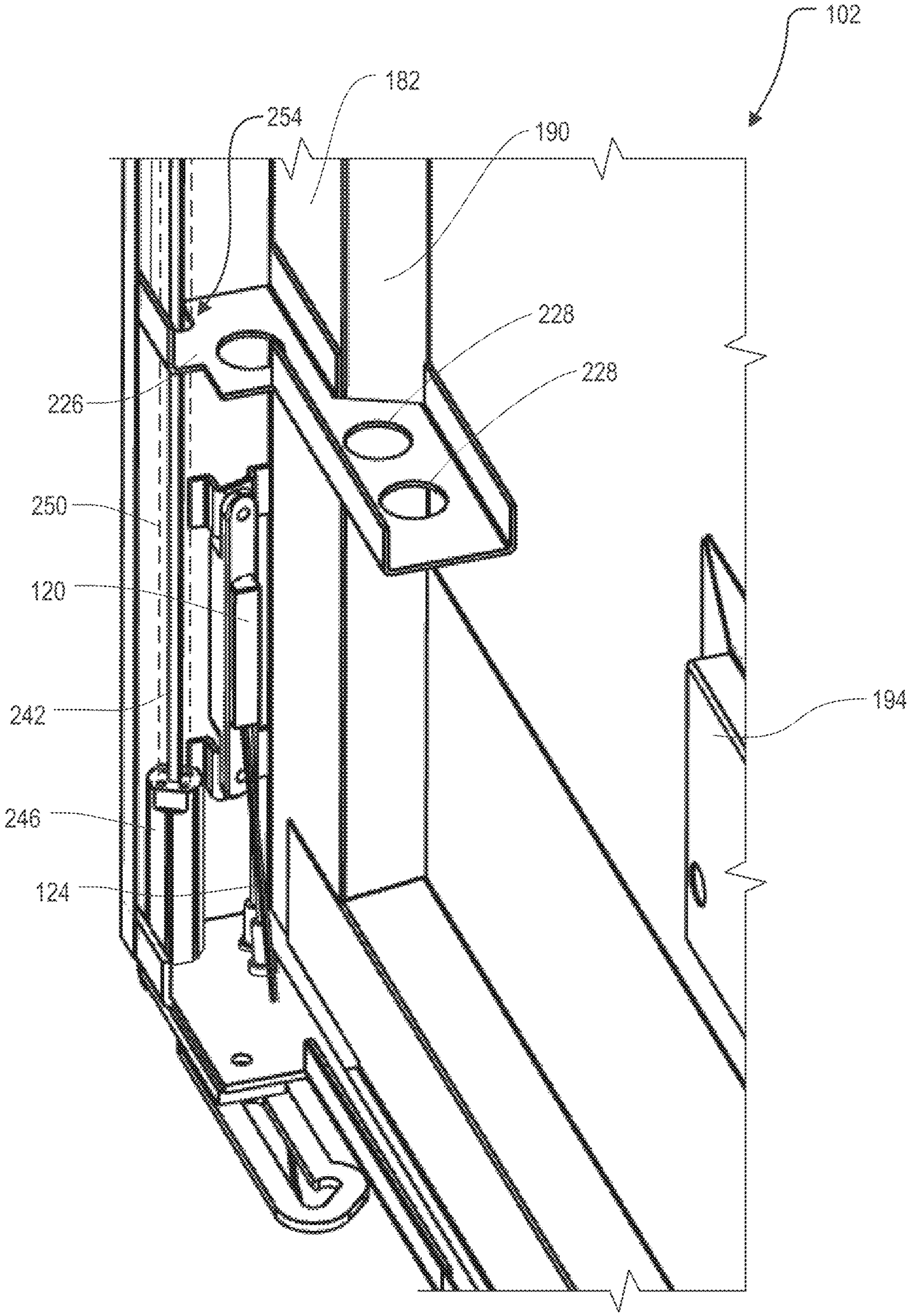
FIG. 20 is an enlarged view of a portion of the door panel with the inner liner removed.

With reference to FIG. 20, the door panel 102 includes a torque rod 242 that is positioned along the edge of the door panel 102 adjacent the steps 158, 162. The torque rod 242 is coupled to a torque rod mount 246 and is shrouded or enclosed by a torque rod tube 250. The torque rod mount 246 connects to interior portions of the hinges 152 on top and bottom sides of the door panel 102. The torque rod 242 includes a rigid material (e.g., tempered steel) and is free to rotate within the torque rod tube 250, which is captured and encapsulated by (or embedded within) the insulative material. The torque rod tube 250 extends through a notch 254 in the support bracket 226 and may be partially supported by the support bracket 226 and by the insulative material. The insulative material holds the torque rod tube 250 in place and inhibits the torque rod tube 250 and the torque rod 242 from failure (e.g., buckling, shearing, etc.).

As illustrated in FIG. 9, the door assembly 100 includes a handle mount 262 that is mounted to the door panel 102 and that has mount brackets 274 and an applique 278. The mount brackets 274 are coupled (e.g., by a plurality of fasteners) to the door panel 102 via a handle support 282 (FIG. 16) that is located within cavity 150 of the door panel 102. The handle support 282 includes a rigid material (e.g., steel), and threaded holes to receive the plurality of fasteners to couple the mount brackets 274 to the door panel 102. The applique 278 has an oblong or elongated shape (e.g., rectangular) and includes recessed flanges 286 that are held behind the bezel 108. The illustrated applique 278 is coupled to the brackets 274. The applique 278 is shaped to fit within the slot 130 of the handle bezel section 114 and to be flush or substantially flush with the electronic display 104 when the electronic display 104 is attached to the door panel 102. The handle 266 is coupled (e.g., by a plurality of fasteners) to the applique 278 such that the fasteners extend through the handle 266, the applique 278, and a top portion of the mount brackets 274.

In some applications, the door panel 102 may be coupled to the case frame 46 and used and operated without the electronic display 104 (e.g., for short-term storage of products, etc.). In these applications, the door panel 102 functions as an opaque, insulative door. In other applications, the door assembly 100 may include the door panel 102 and any type of marketing advertisement and/or display, including but not limited to an electronic display such as the display 104. For example, material may be incorporated on or attached to the first panel 142 to convey marketing or other media to customers.

The illustrated door panel 102 has a weight of approximately 32 pounds, and the door panel 102 and the bezel configuration 108, in combination, have a weight of approximately 35 pounds. As such, the door panel 102 has an approximately 24% to 32% weight reduction relative to existing medium-temperature doors. Additionally, the door panel 102 has an even greater weight reduction compared to typical low-temperature doors (e.g., doors with three glass panes), with the weight reduction exceeding 32% (e.g., more than 40% weight reduction compared to three-pane door assemblies).

In embodiments of the door assembly 100 including the electronic display 104, the door assembly 100 is assembled by first assembling the door panel 102 and attaching the electronic display 104 to the door panel 102. The door panel 102 is assembled by positioning and/or mounting corresponding components (e.g., the plates that define the pockets 194, the support brackets 226, the torque rod 242 and torque rod tube 250, the support 282, etc.) to the second panel 146 and positioning and/or mounting the hinge supports 230 and the handle mount 262 to the first panel 142. Any electronic components (e.g., wires 124) are coupled to or routed through the panels 142, 146 (and through the cavity 150) before the first panel 142 is positioned over the second panel 146 and attached to each other (e.g., welded, via fasteners, etc.) such that the door panel cavity 150 is fully enclosed by the panels 142, 146. Insulative material (e.g., polyurethane foam) may then be inserted into the door panel cavity 150 through the pour hole 234. In some embodiments, the insulative material may expand on or soon after entering the door panel cavity 150. As such, pressure may build up within the door panel 102. The flap 238 may function as a check valve such that expanding insulative material will press the flap 238 against the angled wall 190 and prevent any of the insulative material from exiting through the pour hole 234. The insulting material within the door panel cavity 150 also functions to secure components in place. For example, prior to adding the insulative material, the hinge supports 230 (FIG. 17) may be coupled or affixed, at least temporarily, to an internal surface of the first panel 142 by an adhesive material (e.g., by double sided tape, other adhesive, etc.). The insulative material may then surround the hinge supports 230 to further secure or permanently couple the hinge supports 230 to the first panel 142. The handle support 282 may be secured to the first panel 142 in a similar manner. Additionally, the insulative material will flow through the apertures 228 in the support brackets 226 to further secure the support brackets 226 within the door panel 102. When the insulative material is fully expanded, the insulative material functions to improve the structural rigidity of the door panel 102. The pressure exerted by the insulative material may be between 10 and 20 psig. In some embodiments, the door panel 102 may include one or more apertures and/or valves to allow a portion of the insulative material to exit the door panel cavity 150 during the expansion process.

The electronic display 104 is assembled by coupling the control area 126 and the electronic components to the screen 106. The electronic display 104 is then coupled to the door panel 102 via the hinges 170. After the electronic display 104 is hinged to the door panel 102, the other edge of the electronic display 104 may be secured to or held in place on the door panel 102 by brackets. The bezel configuration 108 is coupled to the door panel 102 and the electronic display 104 to complete the assembly process. When attached, the bezel configuration 108 covers outer portions of the door panel 102 and is flush or substantially flush with screen 106 of the electronic display 104. In some embodiments, the bezel configuration 108 may overlap the perimeter of the electronic display 104. The electronic display 104 is fixed relative to the door panel 102 with the bezel configuration 108 coupled to the door panel 102 and the electronic display 104.

During operation of the door assembly 100, the door assembly 100 is coupled to the case frame 46 and a user may pivot the door assembly 100 between an opened position and a closed position relative to the case frame 46. When the user pivots the door assembly 100 to an opened position, the torque rod 242 rotates within the torque rod tube 250, which stores kinetic energy. After the door assembly 100 is released, the stored kinetic energy within the torque rod 242 is released, which causes the door assembly 100 to pivot back to the closed position (e.g., a self-close mechanism). In some embodiments, the door assembly 100 may be returned to the closed position by the torque rod 242 after the door assembly 100 is pivoted to an angle between 10 and 90 degrees relative to the closed position.

When the door assembly 100 is opened, even partially, the optical sensors 206 may be triggered or turned on (e.g., by a sensor (e.g., motion, accelerometer, gyroscope, etc.), etc.). In some embodiments, the optical sensors 206 are triggered when the door assembly 100 is opened to a 45 degree angle relative to closed position. The optical sensors 206 facing the product 14 may capture (e.g., via a picture or video) the product 14. The capture may then be used (e.g., by the controller) to determine a characteristic (e.g., a stock condition) of the product 14. In other embodiments, the optical sensors 206 may be triggered by a different stimulus (e.g., motion from the user or a different angle of rotation).

During operation of the refrigerated merchandiser 10, heat is generated (e.g., by the screen 106, the electronic components 128, etc.) within a front cavity 290 (FIG. 7), which is defined by the first side 138 of the door panel 102 and a second side of the electronic display 104. Airflow may flow through the front cavity 290 via the vents 132. The airflow may be assisted by an air mover (e.g., a fan) that may be located adjacent the control area 126. FIG. 11 illustrates a schematic airflow, in which air enters the door assembly 100 through the vents 192 in the bottom bezel section 116 and is filtered by the air filter 272. The air then flows through the front cavity 290 toward the top bezel section 110 and out through the vents 132 in the top bezel section 110. The airflow functions to remove heat from the front cavity 290 and to cool down components that border the front cavity 290.

At any time, it may be desired to access the electronic components 128. For example, a user may want to adjust (e.g., program, calibrate, edit, etc.) the electronic display 104, or the electronic display may need service. The door assembly 100 is partially disassembled by removing the top bezel section 110, the hinge bezel section 112, and the handle bezel section 114. The electronic display 104 may then be pivoted relative to the door panel 102 about the hinges 170 (e.g., after removing the brackets on the non-hinge side of the door panel 102). The handle 266 and the handle mount 262 need not be removed to pivot the electronic display 104 relative to the door panel 102. Additionally, in other embodiments, the electronic display 104 may be slidable relative to the door panel 102 via a track. In these embodiments, a user may slide the electronic display 104 to access the electronic components 128.

The invention claimed is:

1. A door configured to be coupled to a merchandiser, the door comprising:

a first opaque panel;

a second opaque panel coupled to the first opaque panel, the first and second opaque panels defining a cavity therebetween;

a hinge coupled to at least one of the first opaque panel or the second opaque panel and configured to pivotably couple the door to the merchandiser;

a stiffener positioned in the cavity and coupled to the first and second opaque panels; and an insulative material disposed in the cavity and configured to bond to one or both of the first opaque panel and the second opaque panel to form a rigid door panel.

2. The door of claim 1, wherein the insulative material at least substantially fills the cavity.

3. The door of claim 1, wherein the insulative material includes polyurethane foam.

4. The door of claim 1, wherein each of the first opaque panel and the second opaque panel is formed of sheet metal.

5. The door of claim 1, further comprising a torque rod located within the cavity via a torque rod mount, wherein the torque rod is configured to rotate within a torque rod tube as the door pivots relative to the merchandiser, and wherein the torque rod tube is captured and encapsulated by the insulative material.

6. The door of claim 1, wherein the stiffener is separate from the first and second opaque panels, and wherein the stiffener is secured to the first and second opaque panels after the insulative material is disposed in the cavity.

7. The door of claim 1, further comprising an electronic display coupled to one of the first opaque panel and the second opaque panel, and a bezel removably coupled to the electronic display.

8. The door of claim 7, wherein the electronic display is pivotably coupled to the door with the bezel removed from the electronic display, and wherein the electronic display is fixed relative to the door with the bezel coupled to the door and the electronic display.

9. The door of claim 1, further comprising a torque rod embedded within the insulative material and connected to the hinge.

10. A door configured to be coupled to a merchandiser, the door comprising:

an opaque shell defining a cavity;

a hinge support temporarily affixed to an internal surface of the opaque shell, the door configured to support a panel via the hinge support;

an insulative material disposed within the cavity and configured to expand within the cavity; and a handle support disposed within the cavity and a handle coupled to the handle support, wherein the handle is coupled to the opaque shell in response to an expansion of the insulative material within the cavity, wherein the hinge support is permanently coupled to the internal surface of the opaque shell in response to expansion of the insulative material within the cavity.

11. The door of claim 10, wherein the panel includes an electronic display.

12. The door of claim 10, wherein the opaque shell includes a pour hole, and wherein the door further comprises a flap disposed within the cavity and pivotably coupled to the opaque shell and movable between an opened position and a closed position, and wherein the flap covers the pour hole in the closed position.

13. The door of claim 12, wherein the insulative material is configured to be inserted into the cavity through the pour hole, and wherein the flap is pressed against the pour hole in response to the expansion of the insulative material.

14. The door of claim 10, further comprising a torque rod disposed within the cavity, wherein the torque rod is configured to rotate in response to pivotal movement of the door.

15. The door of claim 14, wherein the torque rod is disposed within the cavity adjacent to the hinge support.

16. A door configured to be coupled to a merchandiser supporting product, the door comprising:

a first opaque panel;

a second opaque panel coupled to the first opaque panel and including a pocket, the first and second opaque panels defining a cavity therebetween;

an insulative material disposed within the cavity; and at least a portion of an inventory management system positioned within the pocket, the inventory management system configured to be oriented in a direction toward the product.

17. The door of claim 16, wherein the inventory management system includes a camera configured to be oriented in the direction toward the product.

18. The door of claim 17, wherein the door is configured to be pivotably coupled to the merchandiser, and wherein the camera captures an image of the product in response to pivotal movement of the door relative to the merchandiser.

19. The door of claim 16, wherein the pocket is a first pocket of a plurality of pockets defined in the second opaque panel, and wherein each pocket of the plurality of pockets supports a camera.

* * * * *